US011750244B2

(12) United States Patent
Critchard et al.

(10) Patent No.: US 11,750,244 B2
(45) Date of Patent: Sep. 5, 2023

(54) POWERLINE INTERFACE COMMUNICATION

(71) Applicant: Baker Hughes Energy Technology UK Limited, Bristol (GB)

(72) Inventors: Steven Critchard, Bristol (GB); Julian Davis, Bristol (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 0 days.

(21) Appl. No.: 16/975,165

(22) PCT Filed: Feb. 27, 2019

(86) PCT No.: PCT/EP2019/025056
§ 371 (c)(1),
(2) Date: Aug. 24, 2020

(87) PCT Pub. No.: WO2019/166132
PCT Pub. Date: Sep. 6, 2019

(65) Prior Publication Data
US 2021/0119669 A1      Apr. 22, 2021

(30) Foreign Application Priority Data

Feb. 27, 2018   (GB) ..................................... 1803166
Feb. 22, 2019   (GB) ..................................... 1902424

(51) Int. Cl.
*H04B 3/54*      (2006.01)
*E21B 21/10*     (2006.01)
*E21B 47/12*     (2012.01)
*H04B 13/02*     (2006.01)

(52) U.S. Cl.
CPC ............ *H04B 3/542* (2013.01); *E21B 21/10* (2013.01); *E21B 47/12* (2013.01); *H04B 13/02* (2013.01); *H04B 2203/5475* (2013.01)

(58) Field of Classification Search
CPC .............................. H04B 3/542; H04B 13/02; H04B 2203/5475; H04B 3/54; E21B 21/10; E21B 47/12; E21B 23/00
See application file for complete search history.

(56) References Cited

U.S. PATENT DOCUMENTS

| 8,794,354 B2 * | 8/2014 | Xu ......................... E21B 47/12 175/286 |
| 2012/0294114 A1 * | 11/2012 | Gochnour .............. H04B 11/00 166/336 |
| 2014/0015449 A1 | 1/2014 | Biester et al. |

FOREIGN PATENT DOCUMENTS

GB           2 352 376 A       1/2001

OTHER PUBLICATIONS

International Search Report of the International Searching Authority for PCT/EP2019/025056 dated Apr. 11, 2019.

* cited by examiner

*Primary Examiner* — Nader Bolourchi
(74) *Attorney, Agent, or Firm* — MINTZ LEVIN COHN FERRIS GLOVSKY AND POPEO, PC

(57) ABSTRACT

A subsea system, a communication system for determining operation of at least one subsea actuator member, and apparatus for controlling one or more valves are disclosed. The subsea system comprises at least one auxiliary equipment and/or valve actuator module; and at least one modem unit that receives power signals; wherein the auxiliary equipment is responsive to an output provided by the modem unit.

19 Claims, 4 Drawing Sheets

POWERLINE INTERFACE COMMUNICATION

CROSS-REFERENCE TO RELATED APPLICATIONS

This application is a U.S. National Stage of International Patent Application No. PCT/EP2019/025056, filed on Feb. 27, 2019, and entitled "Powerline Interface Communication. International Patent Application No. PCT/EP2019/025056 claims the benefit of GB 1803166.6, filed on Feb. 27, 2018 and GB 1902424.9, filed on Feb. 22, 2019. The entirety of each of these applications is incorporated by reference.

BACKGROUND

Field

The present invention relates to communication between a subsea control system and one or more actuators or auxiliary equipment at a subsea environment. In particular, but not exclusively, the present invention relates to a communication over powerline technique for electrical actuation of auxiliary equipment within a subsea control system.

Description of Related Art

Within subsea controls there is a market drive to reduce capital expenditures (CAPEX) and operating expenses (OPEX), reduce infrastructure complexity, improve diagnostics, enhance command and control, improve reliability, improve availability, increase safety and reduce environmental impact of the controls solution.

There is a perception that this can be achieved by providing system solutions, which utilise partial or full electrical actuation, rather than the incumbent technology which utilises electrohydraulic actuation. Various auxiliary equipment needs actuation. One possible type of auxiliary equipment is a control valve.

Although beneficial, electrical actuation has proven CAPEX prohibitive when compared to electrohydraulic system solutions.

One contributing factor is the required quantity of electrical interfaces between the control system and the actuators to deliver the necessary control. The associated quantity of electrical connectors, junction boxes and the pin count of connectors introduce notable cost, complexity and the potential to impact system reliability when compared to hydraulic actuation interfaces.

SUMMARY

It is an aim of the present invention to at least partly mitigate the above-mentioned problems.

It is an aim of certain embodiments of the present invention to reduce the connection member (e.g. pin or socket) count at wet mating connectors used to provide power and/or communication signals to auxiliary equipment or valve actuation modules.

It is an aim of certain embodiments of the present invention to provide apparatus and a method that utilises only a Live 1 (L1) or Live 2 (L2) input signal over a wet mating connector to provide power and control communication for an actuator of a subsea valve or auxiliary equipment.

It is an aim of certain embodiments of the present invention to provide in built redundancy as well as reducing electrical connection member headcount that includes only two sets of L1 and L2 inputs for motor drives for a subsea valve actuator.

It is an aim of certain embodiments of the present invention to provide communication over power system (COPS), often referred to as a Powerline System (PLS), for example broadband over powerline (BPL) or other such power line signalling techniques, via a power cable connection to auxiliary equipment or actuators, such as a control valve actuator acting on a master valve or pilot valve, in a subsea environment.

According to a first aspect of the present invention there is a subsea system, comprising:
- at least one auxiliary equipment and/or valve actuator module; and
- at least one modem unit that receives power signals; wherein
- the auxiliary equipment is responsive to an output provided by the modem unit.

Aptly the valve actuator module comprises at least one actuator for actuating the auxiliary equipment wherein the actuator is responsive to an output provided by the modem unit.

Aptly the subsea system further comprises:
- a housing;
- at least one wet mating connector, comprising at least one connection member on an outer surface of the housing and connectable to a power cable that receives the power signals; and
- the modem unit is in the housing and is connected to said at least one connection member.

Aptly the valve actuating module is releasable.

Aptly each connection member comprises a single pin or single socket of a wet mating connector.

Aptly the wet mating connector comprises four or less connection members.

Aptly the wet mating connector does not include any connection member allocated to a dedicated incoming signal wire.

Aptly the power cable is a cable that does not include a dedicated signal wire.

Aptly the housing is marine proof.

Aptly the wet mating connector comprises two connection members or four connection members.

Aptly the valve actuating module comprises a single wet mating connector connectable to a single power cable.

Aptly the subsea system further comprises at least one electrical interface between a control system and actuators, wherein the interface provides communications, control, command and power between each actuator and the control system.

Aptly the control system comprises a SCM, or a PCDM, or a floating facility, or a topside vessel, or a topside rig, or an onshore facility.

According to a second aspect of the present invention there is a communication system for determining operation of at least one subsea actuator member, comprising:
- at least one actuator member operating responsive to a motor drive unit to thereby determine a state of auxiliary equipment disposed at a subsea location;
- a power line modem in a housing that houses the motor drive unit and that provides a control signal that determines operation of the drive unit; and
- a wet mating connector of the housing that includes a plurality of electrical connection members.

Aptly the wet mating connector comprises only two connection members or only four connection members.

Aptly only a positive supply contact and a return supply contact for each motor drive unit in the housing are provided at the wet mating connector.

Aptly the control signal from the power line modem is connected directly or indirectly to the respective motor drive unit.

According to a third aspect of the present invention there is apparatus for controlling one or more valves, comprising:

- at least one input electrical connection member operable to receive a signal from which a power and data signal are derivable;
- at least one signal processing member in electrical and/or data communication with each of the input electrical connection members operable to at least partly separate the power signal and data signal; and
- at least one motor configured to actuate at least one valve using the power signal; wherein
- the power signal is modulated responsive to the data signal.

Aptly the at least one signal processing member comprises a modem member and/or a diplexer member.

Aptly the data signals are transmitted from the signal processing member to a controller member which is operable to send the data signals to a motor driving member to thereby modulate the power signals.

Aptly the power signals are transmitted from the diplexer member to the motor driving member.

Aptly the signal from which the power and data signals are derivable is provided to the at least one electrical input port from a subsea control module (SCM) and/or a power and communications distribution module (PCDM).

Aptly the signal from which the power and data signals are derivable is provided to the at least one electrical input port from a floating facility.

Aptly the signal from which the power and data signals are derivable is provided to the at least one electrical input port from other topside facility i.e. topside vessel, topside rig, or onshore facility.

Certain embodiments of the present invention provide the advantage that it is possible to manage the quantity of connectors and reduce the physical electrical complexity of the electrical interface between the control system and actuator or auxiliary equipment by the introduction of a Multidrop COPS/PLS between a topside or subsea control system and the actuators or auxiliary equipment. This interface provides communications, control, command and power between the actuator or auxiliary equipment and the control system.

Communications and power may be multi-dropped from the control system to the actuators or auxiliary equipment. This allows actuators connected to an interface to receive a signal from which power and data are derivable from the control system that is mutually connected to said interface. There is no need for a dedicated point to point connection for each actuator or auxiliary equipment to the control system. For example, there could be one COPS cable between an SCM or PCDM and an interface, and one cable per actuator from the interface to each said actuator. This reduces the required electrical connectors on the actuator to one, and the connection member, for example pin or socket, count of the connector to one or more (aptly two or three or four or five) connection members e.g. sockets or pins for redundant systems and to one or more (aptly two or three or four) connection members e.g. sockets or pins for non-redundant systems. Aptly there are only two electrical connection members (i.e. two pins) for a connector in a system that does not have redundancy. Alternatively, for a system that has redundancy and that consequently provides signals/power for two motor drives, only four electrical connection members (i.e. pins) are provided. Aptly this reduces the required electrical connectors on the actuator or auxiliary equipment as appropriate for the level of redundancy. Such rationalisation of connectors reduces the cost of electrical interfaces between the control system and actuators or auxiliary equipment.

Certain embodiments of the present invention provide the advantage that one or more modem units are housed with actuators or auxiliary equipment. Each modem unit comprises a power line modem meaning that the number of electrical connection members at a wet mating connector can be reduced to only provide a positive supply and return connection member. The modem unit effectively strips off communication signals from the power line and utilises the extracted communication signals to control the actuator which is used to control operation of the auxiliary equipment, such as a control valve.

Certain embodiments of the present invention provide the advantage that an SCM or PCDM connected to a high-speed backbone can provide COPS (e.g. BPL) compliant signals which are directly or indirectly supplied to electrical actuators. The electrical actuator is connected via a wet mating connector which only needs sufficient electrical members (such as pins or sockets) to receive power signals. Because each electrical actuator or auxiliary equipment includes its own power line modem (which may be a BPL modem or other COPS modem) only a Live 1 and Live 2 connection need to be included in an associated wet mating connector.

Certain embodiments of the present invention enable greenfield or brownfield site working.

BRIEF DESCRIPTION OF THE DRAWINGS

Certain embodiments of the present invention will now be described hereinafter, by way of example only, with reference to the accompanying drawings in which.

In the drawings like reference numerals refer to like parts.

DETAILED DESCRIPTION

Figure 1:
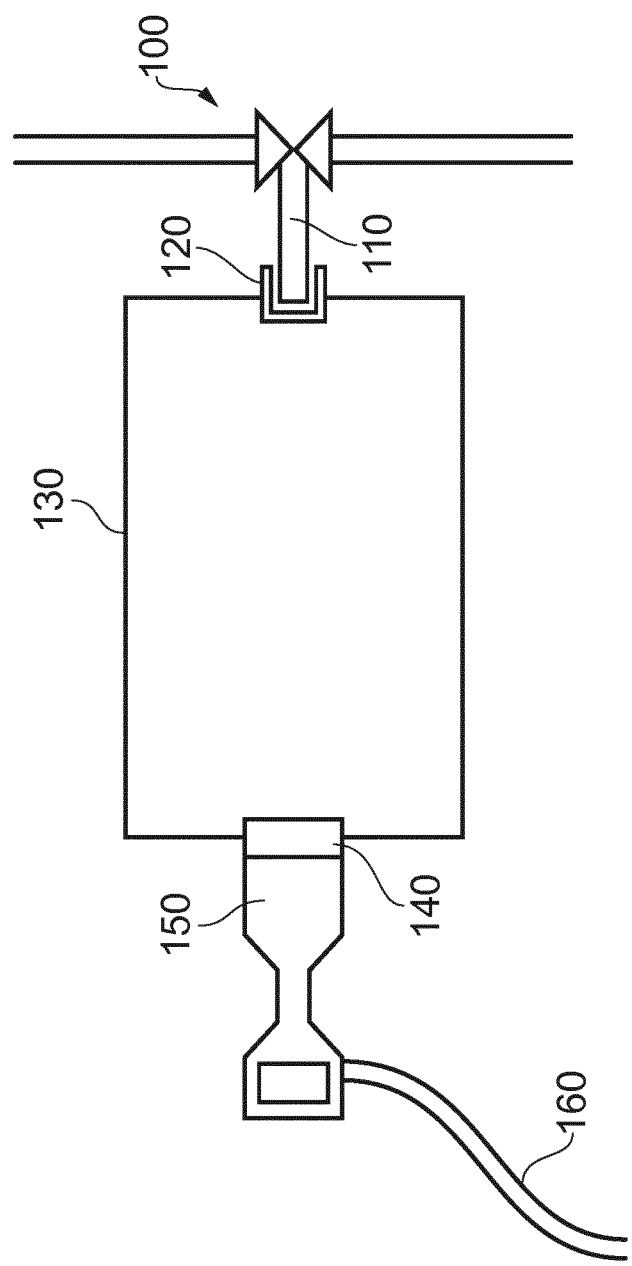
FIG. 1 illustrates an electrical actuator for a subsea valve.

FIG. 1 illustrates subsea auxiliary equipment 100 in the form of a valve. It will be appreciated that certain embodiments of the present invention are applicable to the control of different types of auxiliary equipment. The valve 100 is driven by a drive element 110 via a mechanical interface 120. The mechanical interface 120 is part of a valve actuator module 130 which is an electrical actuator with Communication Over Powerline System (COPS) interface. An electrical interface is made via a wet mating connector 140 which can be secured to a releasable connector 150 that carries a power cable 160.

Figure 2:
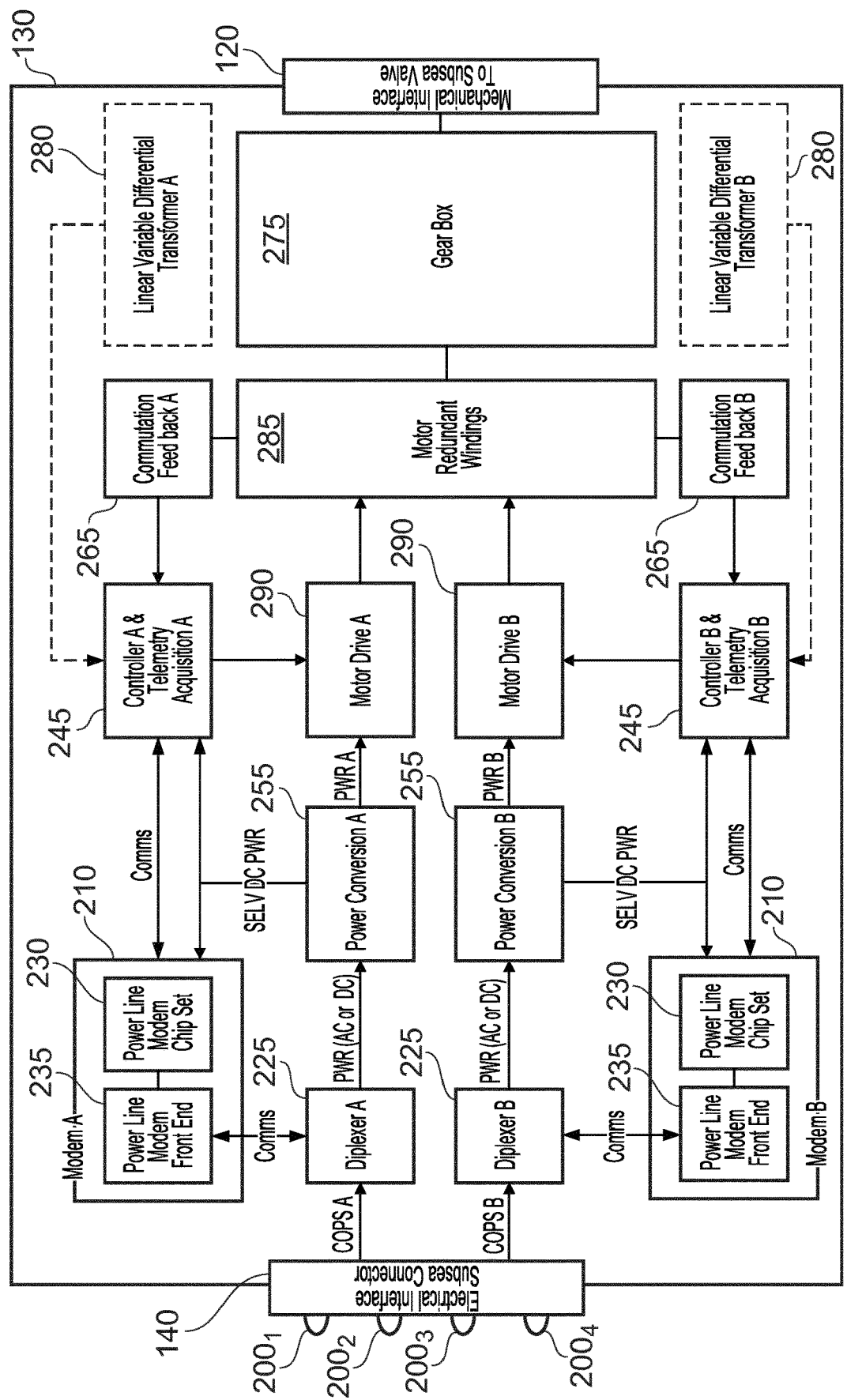
FIG. 2 illustrates a subsea actuator with COPS e.g. BPL interface.

FIG. 2 illustrates the electrical actuator with COPS interface 130 in more detail and illustrates how the wet mating connector 140 includes four electrical connection members in the form of pins 200. Four pins are utilised because the interface includes in built redundancy. Two pins $200_{1,2}$ are used for respective Live 1 (L1) and Live 2 (L2) power input signals that are received from the power cable 160. Two remaining pins are utilised for respective Live 1 and Live 2 signals also carried by the power cable 160. As part of a power line modem unit, a diplexer 225 extracts communication data from the incoming signals from the respective pair of electrical connection members. A power line modem 210 is in the housing of the valve actuator module 130 and provides control signals to the respective motor drive A. A further modem 210 operates in a similar manner to provide control signals to motor drive B. A power conversion unit 255 converts the power signal extracted by the diplexer 225 and provides power signals to the power line modem 210, a controller and telemetry acquisition unit 245, and a motor drive unit 290. A communication and feedback unit 265 provides angular position data to the controller and telemetry acquisition unit 245. If present, a linear variable differential transformer 280 provides linear position sensor data to the controller and telemetry acquisition unit 245.

COPs signal supply pin for redundancy sub-system 'A' ($200_1$)
COPs signal return pin for redundancy sub-system 'A' ($200_2$)
COPs signal supply pin for redundancy sub-system 'B' ($200_3$)
COPs signal return pin for redundancy sub-system 'B' ($200_4$)
Diplexer (225)
  COPS input separated out into separate power (output) and communications (input output) via passive filter elements.
    Power passes through (with minimum attenuation) a Low Pass Filter (LPF) and a Communications Blocking Filter (CBF) to the motor drive.
      CBF presents a high impedance to the communications signals and prevents loading of the communications drivers by the motor drive input impedance.
      CBF attenuates the communications signal frequency components of the COPS signal so that (predominantly) only power is delivered to the motor drive.
      CBF prevents conducted emissions from the motor drive (that are within the communications pass band) from propagating back onto the COPS line.
    Communications pass through a High Pass Filter (HPF) or Band Pass Filter (BPF) and Communication Isolation Transformers (CIT) to the modem front end.
      BPF presents a high impedance to the power frequencies and attenuates the power waveform and associated harmonics of the COPS signal so that only (predominantly) communications are delivered to the modem.
      BPF is bi-directional, enabling:
        Communications to pass from the COPS line to the modem receiver
        Communications to pass from the modem transmitter to the COPS line
PLS Modem (210)
  Communications device capable of receiving and transmitting modulated communications signals via a power line signaling system.
PLS Modem Chip Set (230)
  This is a modem chip set that controls data flow.
PLS Modem Front End (235)
  Robust modem transmitter and receiver interface circuitry incorporating filter functions and enhanced conducted emissions immunity so that the modem is tolerant of the noise and transients associated with COPS/PLS applications and motor drive applications.
Controller and telemetry acquisition (245)
  Unit capable of the following:
    Communications control
      Modem interfacing and management
      Topside command interpretation
      Motor/actuator status monitoring
      Sensor telemetry formatting, packetisation
    Actuator Motor Drive control
      Motor sensor signal conditioning and interpretation
      Motor telemetry acquisition and interpretation
      Temperature, vibration (accelerometers), pressure within actuator pressure isolated enclosure
Power Conversion (255)
  Unit capable of converting either DC or AC power as delivered to the actuator into various forms as required for actuator operation including but not limited to:
    Motor drive power
    Modem power
    Controller power
Motor Commutation Feedback (265)
  Angular position sensors housed within the motor used to determine rotor position and subsequently used by the motor controller as part of a feedback motor control loop.
Gearbox (275)
  Torque multiplier for rotary drives
  Or converters rotary gearbox output into a linear drive for linear displacement actuator(s).
Linear Variable Differential Transformer (280)
  Position sensor used for linear as opposed to rotary valve actuators (shown in dashed detail as device will only be fitted for linear actuators)
Motor redundant windings (285)
  Motor windings to facilitate independent A and B function control and drive of the electric actuator.
Mechanical Interface to Valve (Stem) (120)
  Linear or rotary mechanical interface to a valve stem to facilitate valve opening and closing.
Motor Drive (290)
  Electronic motor that drives gearbox.

Figure 3:
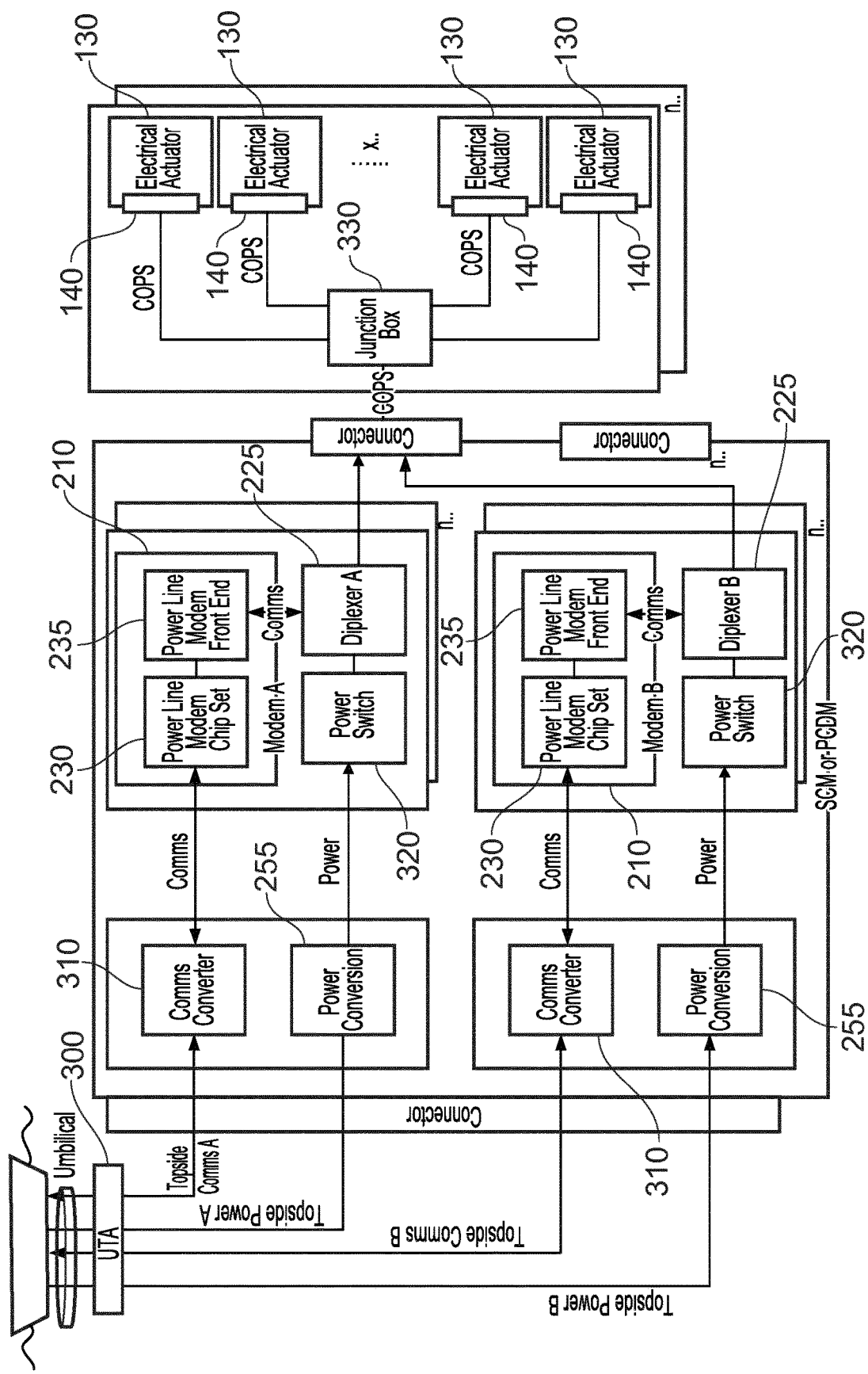
FIG. 3 illustrates a greenfield site.

FIG. 3 illustrates an electrical actuator system at a greenfield site utilising communication over powerlines system (COPS). Communication signals pass from an umbilical termination assembly (UTA) 300 to a subsea SCM or PCDM communications converter unit 310. Power signals pass from the UTA 300 to a subsea SCM or PCDM power conversion unit 255. Input and output communication can occur between the communications converter 310 and a power line modem 210. A COPS signal is formed from the converted power and communication signals by a diplexer 225 and is transmitted to a junction box 330. Electrical actuators are multidropped from the junction box 330 and receive the COPS signal through a wet mating connector 140.

Umbilical Termination Assembly UTA (300)
As ordinarily understood by the skilled person.
Communications Converter (310)
  Converts communications data passing between a PLS modem 210 and a UTA or a platform 400 to appropriate communication standard for transmission across appropriate interface standard.

Power Switch (320)
  As ordinarily understood by the skilled person.
Junction Box (330)
  Electrical interface that facilitates multi-dropping functionality between any SCMs, PCDMs, actuators, or auxiliary equipment mutually connected to same junction box.

Figure 4:
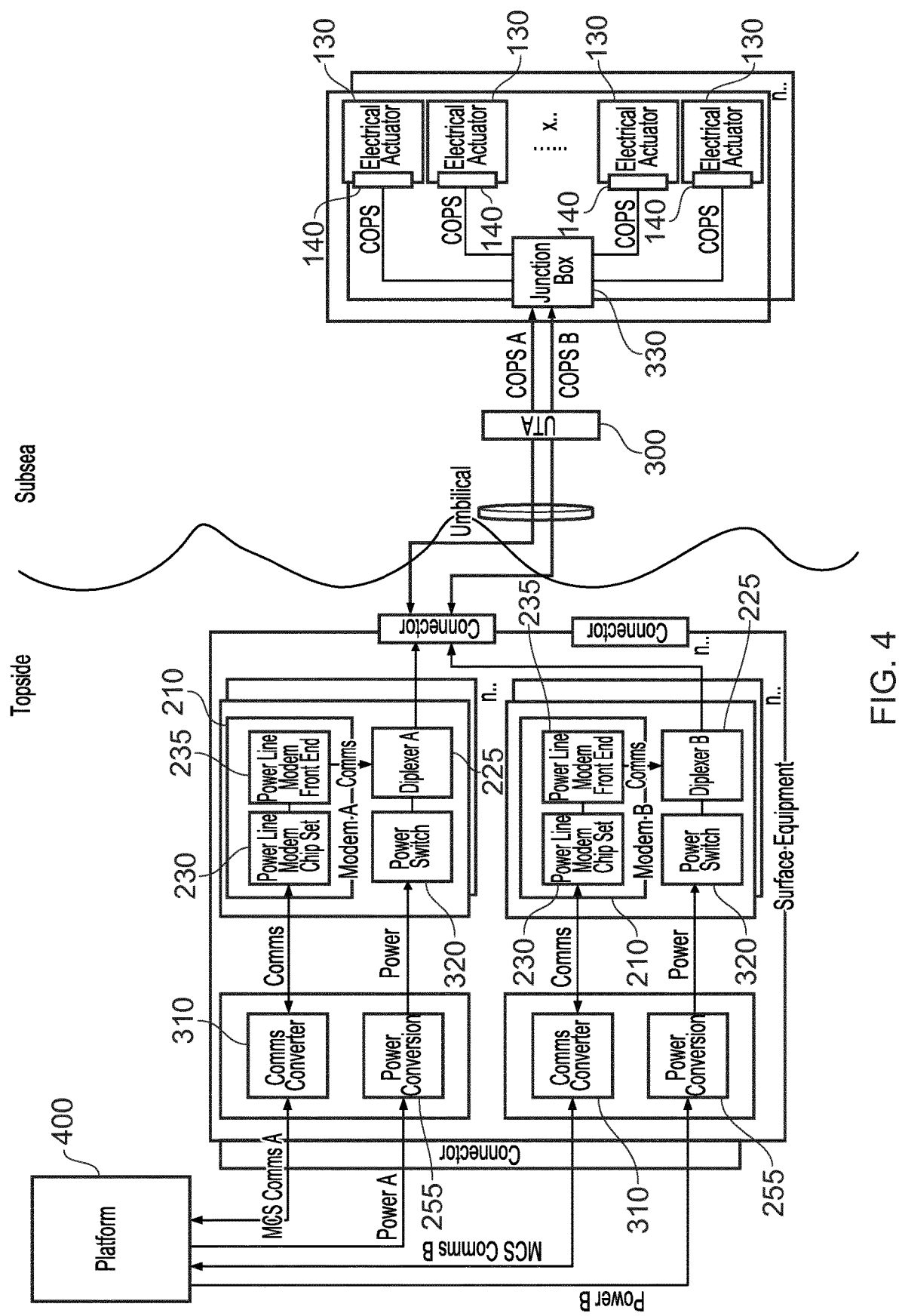
FIG. 4 illustrates a brownfield site.

FIG. 4 illustrates an alternative electrical actuator system at a brownfield site utilising communication over powerline system (COPS). FIG. 4 is in many ways similar to FIG. 3, except a COPS signal is formed topside and is transmitted subsea to a junction box 330 via a UTA 300.

Platform (400)
  This may be a floating facility, or a topside vessel, or a topside rig, or an onshore facility.

Aptly a COPS modem is installed within the control system located subsea, i.e. within a Subsea Control Module (SCM) or Topside within the Master Control Station (MCS). A further modem is required within each subsea actuator completing the communications link between the actuators and the control system. The modems providing the command, control and communication interface between the actuators and the control system.

The COPS modem provides tolerable bandwidth for limited diagnostics and adequate command and control which help to satisfy the drive for reduced OPEX. By locating the COPS modem within the actuator, the aforementioned can achieve adequate control whilst keeping the connector and pin count associated with the electrical interface to an absolute minimum. More than the absolute minimum could of course optionally be used. By contrast achieving command and control using traditional interfaces such as Fieldbus i.e. Industrial Ethernet, Modbus or Canbus, with separate power conductors would result in a proliferation of connectors, pin count and junction boxes. This would negatively impact system cost and reliability.

Direct actuator command and control is possible utilising COPS Modems over only the power supply from a solely topside control system. The available communications bandwidth would further be reduced and at least partially depend on offset to the subsea actuator from the topside control system. The performance and capability of such a system would largely depend on offset.

In a system where the communications from topside to subsea structures, such as Manifolds or Trees, is via high speed Digital Subscriber Line or Optical Fibre. COPS becomes beneficial as the offset from the control system's high-speed backbone to the electrical actuators located on the structure is short (in the order of tens of meters). It is therefore possible, over COPS to achieve tolerable communications bandwidth which is suitable for limited diagnostics and adequate command and control, whilst keeping CAPEX associated with the electrical interface to a minimum.

COPS has advantages over other communication technologies as command and control is feasible without the need for a dedicated communication bus or point to point communication interfaces from the control system to the actuators.

As an alternative embodiment a COPS modem is installed within the control system located subsea, i.e. within a Subsea Control Module or Topside within the Master Control Station. A further modem is required within each subsea actuator completing the communications link between the actuators and the control system. The modems providing the command, control and communication interface between the actuators and the control system.

The COPS modem provides tolerable bandwidth for limited diagnostics and basis command and control which helps to satisfy the drive for reduced OPEX. By locating a BPL modem within the actuator, the aforementioned can achieve adequate control whilst keeping the connector and pin count associated with the electrical interface to an absolute minimum. By contrast achieving command and control the using traditional interfaces such as Fieldbus i.e. Industrial Ethernet, Modbus or Canbus, with separate power conductors would result in a proliferation of connectors, pin count and junction boxes. This would negatively impact system cost and reliability.

Direct actuator command and control is possible utilising BPL Modems over only the power supply from a solely topside control system. The available communications bandwidth is at least partially dependent upon on offset to the subsea actuator from the topside control system. The performance and capability of such a system would largely depend on offset.

In a system where the communications from topside to subsea structures, such as Manifolds or Trees, is via high speed Digital Subscriber Line or Optical Fibre. BPL becomes very beneficial as the offset from the control system's high-speed backbone to the electrical actuators located on the structure is short (in the order of tens of meters). It is therefore possible, over BPL to achieve and exceed the necessary communications bandwidth for improved diagnostics and enhanced command and control, whilst keeping CAPEX associated with the electrical interface to a minimum.

BPL has advantages over several existing communications over power lines technologies in that it is possible to achieve much higher data rates over comparable distances allowing for improved diagnostics and enhanced command and control of the actuators to be possible. These enhancements are also feasible without the need for a dedicated communication bus or point to point communication interfaces from the control system to the actuators.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A subsea system, comprising:
a valve actuator module comprising
   a housing;
   a wet mating connector comprising a connection member on an outer surface of the housing and connectable to a power cable that receives a power signal, wherein the wet mating connector comprises a single pin or single socket;
   a modem unit within the housing and communicatively coupled to the wet mating connector and configured to receive the power signal, wherein the valve actuator module is configured to operate responsive to an output provided by the modem unit, the modem unit further comprising
      a diplexer member configured to separate the received power signal into a power output and a communications output; and
   a motor drive within the housing for actuating at least one auxiliary equipment, wherein the motor drive is responsive to the power output and the communications output provided by the modem unit.

2. The subsea system as in claim 1, wherein:
the at least one valve actuator module is releasable.

3. The subsea system as in claim 1, wherein:
the wet mating connector does not include any connection member allocated to a dedicated incoming signal wire.

4. The subsea system as in claim 1, wherein:
the power cable is a cable that does not include a dedicated incoming signal wire.

5. The subsea system as in claim 1, wherein:
the at least one valve actuator module comprises a single wet mating connector connectable to a single power cable.

6. The subsea system of claim 1, wherein the power cable is a multi-drop power cable, and the system further comprises:
a junction box comprising
   at least one second wet mating connector comprising at least one connection member on an outer surface of the junction box and connectable to at least one second power cable that receives the power signals from a topside and/or a subsea control system; and
   at least one multi-drop power cable having a first end and a second end, wherein the at least one multi-drop cable is coupled at the first end to the junction box, and is coupled at the second end to the wet mating connector of at least one of the valve actuator module.

7. The subsea system of claim 1 further comprising:
a gearbox within the housing and coupled to the motor drive, for actuating the at least one auxiliary equipment.

8. The subsea system as claimed in claim 1, wherein the diplexer member includes passive filter elements.

9. A communication system for determining operation of at least one subsea actuator member, comprising:
a housing;
a motor drive unit within the housing for actuating at least one auxiliary equipment;
a power line modem in the housing including a diplexer member configured to separate a received power signal into a power output and a control signal, and that provides the control signal that determines operation of the motor drive unit responsive to received power signals; and
a wet mating connector on an outer surface of the housing that includes an electrical connection member and is configured to connect a power cable to the power line modem, wherein the wet mating connector includes a single pin or single socket configured to convey the power signal from the power cable to the power line modem.

10. The communication system as in claim 9, wherein;
only a positive supply contact and a return supply contact for each motor drive unit in the housing are provided at the wet mating connector.

11. The communication system as in claim 9, wherein;
the control signal from the power line modem is connected directly or indirectly to the respective motor drive unit.

12. The communication system of claim 9, wherein the power cable is a multi-drop power cable, and the communication system further comprises:
a junction box comprising
   at least one second wet mating connector comprising at least one connection member on an outer surface of the junction box and connectable to at least one second power line that receives the power signals from a topside and/or a subsea control system; and
   at least one multi-drop power cable having a first end and a second end, wherein the at least one multi-drop cable is coupled at the first end to the junction box, and is coupled at the second end to the wet mating connector of at least one of the communication system.

13. The communication system of claim 9, further comprising:
a gearbox within the housing and coupled to the motor drive unit, for actuating the at least one auxiliary equipment.

14. An apparatus for controlling one or more valves, comprising:
at least one valve actuator module comprising:
   a housing;
   a wet mating connector comprising an input electrical connection member on an outer surface of the housing and connected to at least one multi-drop power cable, the input electrical connection operable to receive at least one signal from which a power signal and a data signal are derivable, wherein the wet mating connector includes a single pin or single socket configured to convey the at least one signal;
   a signal processing member, including a diplexer member, within the housing in electrical and/or data communication with each of the input electrical connection member that is operable to at least partly separate the at least one signal into the power signal and the data signal;
a junction box comprising:
   at least one second wet mating connector comprising at least one connection member on an outer surface of the junction box and connectable to at least one second power line that receives the power signals from a topside and/or a subsea control system; and
   the at least one multi-drop power cable having a first end and a second end, wherein the at least one multi-drop power cable is coupled at the first end to the junction box, and is coupled at the second end to the wet mating connector of at least one of the communication system; and a motor within the housing configured to actuate at least one valve using the power signal;

wherein the power signal is modulated responsive to the data signal, and wherein the valve actuator module is releasable.

15. The apparatus as in claim 14, wherein;

the signal processing member comprises a modem member and/or a diplexer member.

16. The apparatus as in claim 14, wherein;

the data signal separated by the signal processing member is transmitted from the signal processing member to a controller member which is operable to send the data signal to the motor to thereby modulate the power signal.

17. The apparatus as in claim 14, wherein;

The at least one signal from which the power and data signals are derivable is provided to the electrical input port from a subsea control module (SCCM) and/or a power and communications distribution module (PCDM).

18. The apparatus as in claim 17, wherein;

the at least one signal from which the power and data signals are derivable is provided to the electrical input port from a floating facility.

19. The apparatus of claim 14, further comprising:

a gearbox within the housing and coupled to the motor, for actuating at least one of the one or more valves.

* * * * *